United States Patent [19]

Attridge et al.

[11] 3,916,965
[45] Nov. 4, 1975

[54] APPARATUS FOR EDGE-SHAPING BOARDS

[76] Inventors: William Earl Attridge, 44 Kennedy St.; Karl Franz Vogel, 101 Berczy St., both of Aurora, Ontario, Canada

[22] Filed: Apr. 10, 1974

[21] Appl. No.: 459,512

Related U.S. Application Data

[63] Continuation of Ser. No. 288,264, Sept. 12, 1972, abandoned.

[30] Foreign Application Priority Data

May 4, 1972   Canada .............................. 141262

[52] U.S. Cl. .......... 144/134 R; 144/117 B; 144/142
[51] Int. Cl.² ............................................ B27C 5/02
[58] Field of Search .... 144/134 R, 131, 142, 144 R, 144/145 R, 145 A, 144 A, 117, 117 B; 83/628

[56]   References Cited
UNITED STATES PATENTS

| | | | |
|---|---|---|---|
| 1,615,088 | 1/1927 | Klieber | 144/142 |
| 2,647,547 | 8/1953 | Gifford | 144/142 |
| 2,830,629 | 4/1958 | Deiters | 144/117 B |
| 2,851,070 | 9/1958 | Hughes | 144/117 B |
| 3,825,046 | 7/1974 | Peterson | 144/142 |

*Primary Examiner*—Donald R. Schran
*Assistant Examiner*—W. D. Bray
*Attorney, Agent, or Firm*—Hirons & Rogers

[57]   ABSTRACT

In apparatus for cutting an irregular longitudinal edge on a board the motor driven edge cutter is mounted for to and fro movement under the control of a motor driven cam of irregular profile, the cam being driven from its motor via a variable or change speed gear to give the effect of a change in cam profile and thereby render the edge completely irregular.

9 Claims, 5 Drawing Figures

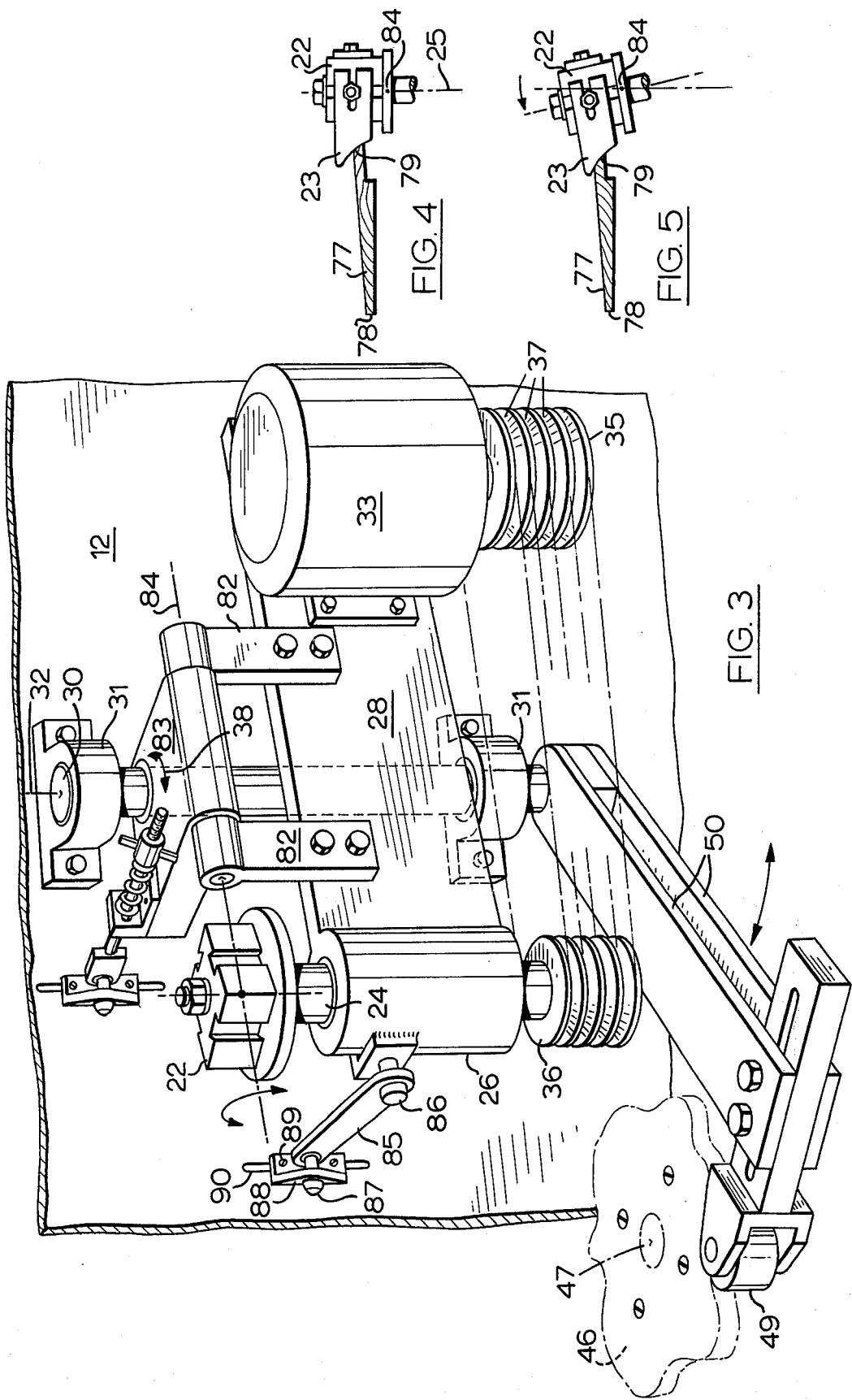

3,916,965

APPARATUS FOR EDGE-SHAPING BOARDS

This is a continuation of application Ser. No. 288,264, filed Sept. 12, 1974, now abandoned.

FIELD OF THE INVENTION

This invention is concerned with apparatus for edge-shaping boards, and with boards which have had an edge thereof formed to an irregular shape.

DESCRIPTION OF THE PRIOR ART

It has been proposed hereto to produce a wood siding product from a straight-edged board by forming one longitudinal edge artificially to an irregular shape.

It has also been proposed to provide a machine for edge-shaping a board to such an irregular shape, the machine comprising a motor-driven cutter which is presented to an edge of the board as the board is moved lengthwise through the machine, manual means being provided to cause engagement of the board edge by the cutter to cut the said irregular shape.

DEFINITION OF THE INVENTION

In accordance with the present invention there is provided a new apparatus for cutting a longitudinal edge of a board to an irregular shape, comprising a body, a bed on the body and on which the board moves in passing through the apparatus in a corresponding longitudinal direction, an edge cutter mounted by the body for to and fro movement in a direction transverse to the said longitudinal direction to engage the cutter with an edge of a board on the bed and to shape the engaged edge thereof, and cutter moving means mounted by the body for moving the edge cutter in an irregular motion in the said transverse direction to cut the engaged edge to the required irregular shape, the cutter moving means comprising a motor, cam means constituted by a cam having an irregular profile and a cooperating cam follower connected between the motor and the edge cutter whereby the edge cutter is driven by the motor through the cam means for the required irregular movement, and a variable speed gear connected between the motor and the cam means for varying the speed at which the cam means is driven by the motor and thereby varying the effect of the irregular cam profile on the to and fro movement of the edge cutter.

DESCRIPTION OF THE DRAWINGS

Particular preferred embodiments of the invention will now be described by way of example, with reference to the accompanying drawings, wherein:

FIG. 3 is a similar view to FIG. 2 of another embodiment wherein the edge cutter is mounted and driven so as to change its angle of inclination as it is moved to and fro against the edge of a board passing through the machine, and FIGS. 4 and 5 are similar side elevations of the edge cutter head to show the mode of operation of the apparatus of FIG. 3.

Similar parts are given the same number in all the FIGURES of the drawing.

DESCRIPTION OF THE PREFERRED EMBODIMENTS

Figure 1:
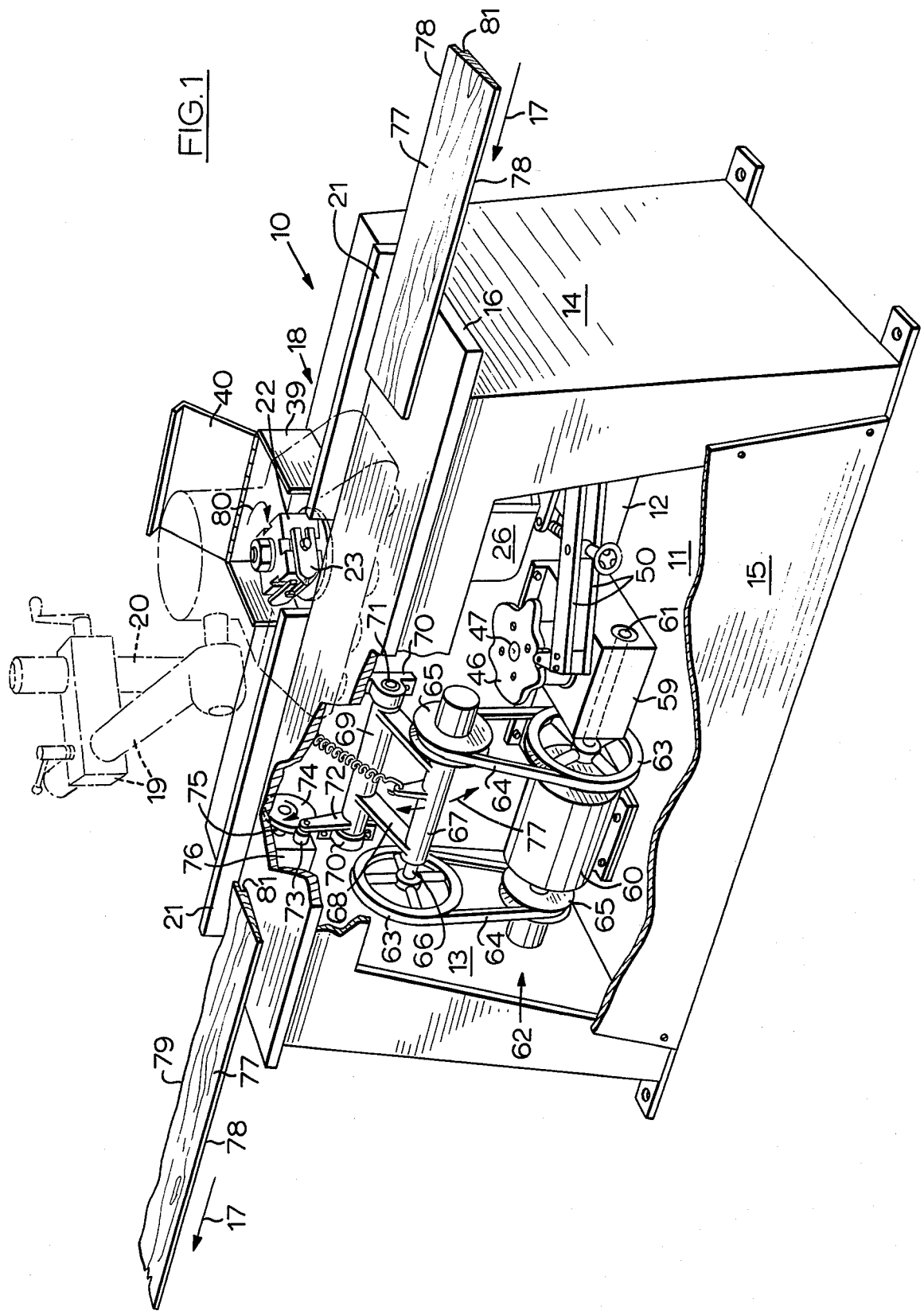
FIG. 1 is a general perspective view of apparatus constituting a first embodiment, parts of the body thereof being shown broken away and parts thereof being shown in broken lines for clarity of illustration.
Figure 2:
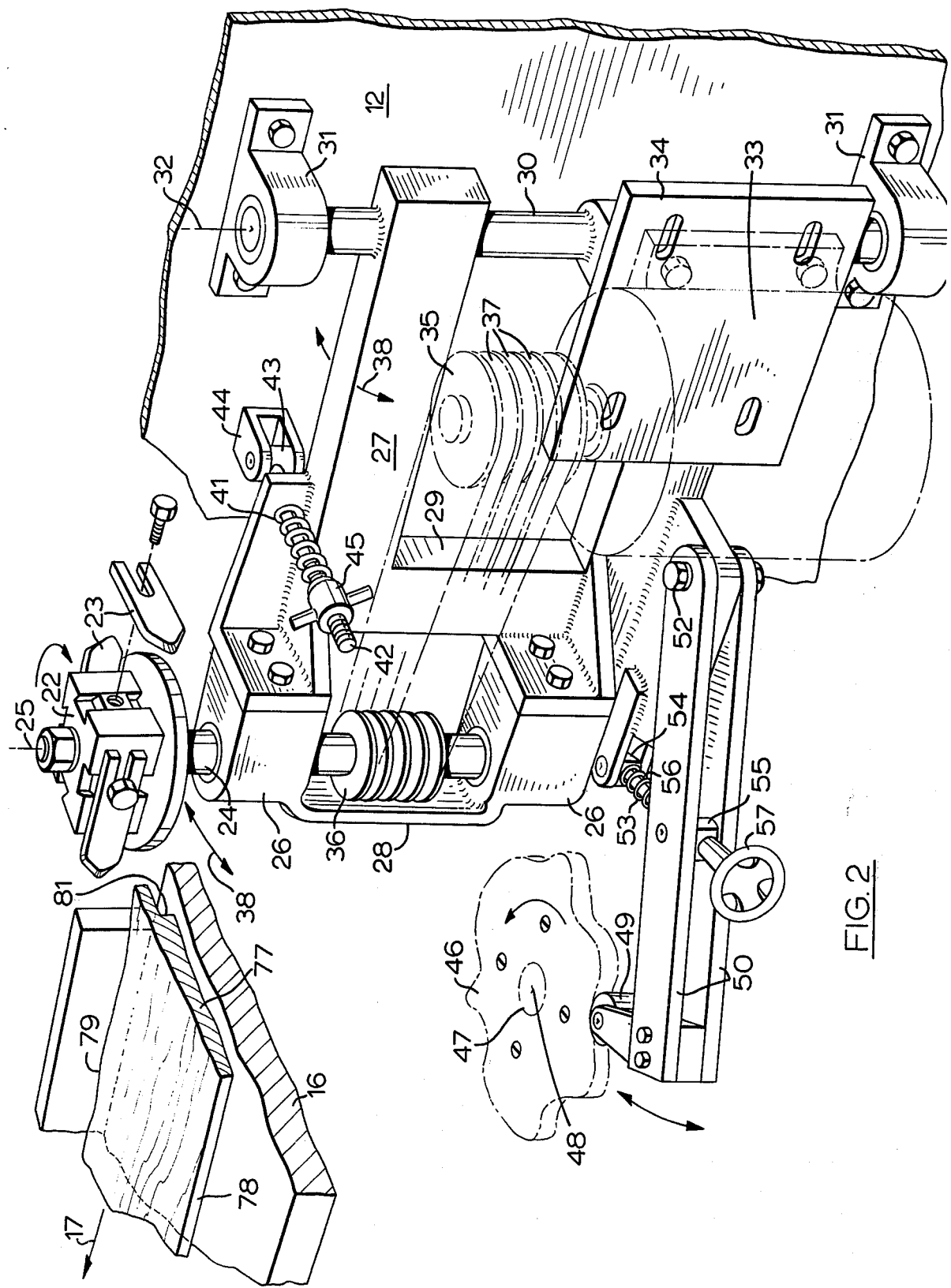
FIG. 2 is a perspective view of part of the apparatus of FIG. 1 drawn to a larger scale in order to show in more detail the means for mounting and driving an edge cutter.

The apparatus illustrated by FIGS. 1 and 2 comprises a frame or body, indicated generally by the reference 10, and comprising a floor 11, rear wall 12, side walls 13 and 14, a removable front wall 15 for access to the body interior and a flat, rigid top wall 16 constituting a bed on which boards to be edge-shaped move in passing through the apparatus in a corresponding longitudinal direction indicated by the arrows 17. The boards are moved over the bed by a motorized drive unit, indicated generally by the reference 18, which rests under its own weight on the boards as they pass beneath it. The unit is mounted on the machine by means of an adjustable arm 19 and a vertical post 20. Such drive units are well known in the art and the specific structure thereof does not form any part of the instant invention, so that further description thereof is believed unnecessary. The apparatus bed is provided with a fixed vertical front fence 21, and may also be provided with a movable back fence (not illustrated) spaced from the front fence and movable to accommodate different widths of board.

An edge cutter head 22 provided with replaceable cutters 23 is mounted on one end of a vertical drive shaft 24 that protrudes through the top wall 16. The shaft is mounted for rotation about a respective axis 25 in spaced bearings 26 carried in arms 27 of a rigid generally U-shaped yoke 28. The yoke arms are rigidly connected intermediately of their length by a crosspiece 29, and are also connected at their other adjacent ends by a pivot rod 30 having its ends mounted in coaxial bearings 31 mounted on the back wall 12. The axis of rotation 32 of the rod 30 is parallel to the axis of rotation of the shaft 24. An electric motor 33 is mounted on a base plate 34 rigidly fastened to the yoke 28 and drives the shaft 24 and the cutter head thereon via multiple belt pulleys 35 and 36 and connecting multiple V-belts 37.

The cutter is thereby mounted for to and fro movement, in the directions of the arrows 38 of FIG. 2, which directions are transverse to the longitudinal direction 17, so that it can engage the immediately adjacent outer edge of a board on the bed through a gap in the fence 21 and cut it to the required irregular shape. As illustrated the cutter is enclosed for safety reasons by a casing 39 provided with a pivoted lid 40. The swingable pivoted yoke 28 normally is biased to move the cutter head away from the engaged board edge by means of a compression spring 41 mounted around a screw-threaded bolt 42 having a head 43 that is pivotally mounted in a clevis 44 fixed to the rear wall 12. The biasing force exerted by the spring 41 is adjusted in known manner by operation of a nut 45.

The means in accordance with the present invention for moving the edge cutter with the desired irregular to-and-fro movement includes cam means constituted in this embodiment by a cam 46 mounted on a shaft 47 for rotation about an axis 48 and a roller cam follower 49. In other embodiments other forms of cam such as longitudinal cams could be used. The roller 49 is mounted at one end of a pair of arms 50 which are pivotally connected at their other ends by a pin 52 to one of the arms 27 of the yoke 28. The rear-most position of the cutter head relative to the guide fence 21 and the corresponding outer edge of the board is set by means of a screw-threaded bolt 53 having its head 54 pivotally connected to the adjacent yoke arm 27 and passing through a reaction member 55 pivoted between the arms 50. A compression spring 56 surrounds the rod, which is rotated by means of a hand wheel 57, and is operative between the head 54 and the reaction member 55.

As the cam is rotated about its axis 48 the roller 49, the arms 50, the yoke 28 and the cutter head move to and fro in a movement determined by the cam profile. If the cam 46 is rotated at constant speed then the irregular edge which is produced on the board would repeat exactly in shape for each revolution of the cam. This repetition in outline is sufficiently apparent to the human eye that, in the case of a siding material produced by the apparatus, upon assembly of the siding into a wall, the desired random effect is not completely obtained.

Accordingly, in this embodiment the shaft 48 is constituted by the output shaft of a speed reduction gear 59, and means for rotating the cam comprise an electric motor 60 mounted on the floor 11 of the apparatus and driving the input shaft 61 of the speed reduction gear via a variable or change speed gear, indicated generally by the reference 62. In this particular embodiment the variable speed gear is constituted by two fixed diameter V-pulleys 63 connected by respective V-belts 64 to respective spring-loaded, variable-diameter pulleys 65. One of the pulleys 65 is mounted on the output shaft of the motor 60, while one of the pulleys 63 is mounted on the input shaft 61. The other pair of pulleys 63 and 65 are mounted upon a common shaft 66 rotatably mounted in an elongated bearing 67. The bearing 67 is connected by a pair of spaced parallel arms 68 to a shaft 69 mounted in bearings 70 for rocking movement about a horizontal axis 71. A radially extending arm 72 fixed to the shaft 69 carries a roller cam follower 73 which engages a cam 74 eccentrically mounted upon the output shaft 75 of a motor-drive unit 76. It will be seen that as the cam 74 rotates the rod 69 rocks about its axis, moving the bearing 67 in an oscillating or rocking motion indicated by the arrows 77, and thereby changing the speed ratio of the gear 62. This speed ratio change constantly changes the effective profile of the cam so that a desired irregular edge shape is obtained. Alternatively the cam follower 73 and its drive mechanism may be replaced by a manually-controllable arrangement for changing the gear speed ratio under the control of a human operator, which would result in an even more random effect.

In operation, a board 77 with two straight parallel longitudinal outer edges 78 (as seen to the right in FIG. 1) is laid on the bed 16 and pushed in contact with the fence 21 into engagement with the drive unit 18, which then moves the board through the apparatus. The drive unit is slightly inclined to urge the board toward the fence, this bias also being supplemented by a wedging action obtained with a board of tapered cross-section (as illustrated). As the board passes the gap in the fence the head is moved to and fro to cut into the adjacent straight edge 78 of the board and thereby produce an irregular edge 79, as seen to the left in FIG. 1. In that the cam 46 is being driven at varying speeds by the motor 60 through the change speed gear 62, under manual or further cam control as described above, then the edge 79 will present a completely irregular appearance. Preferably the cam is arranged that at irregular intervals along the length of the board the cutter just disengages therefrom, so as to provide parts of maximum width that will engage the fence and maintain the board moving accurately parallel to the fence, which is made of sufficient length for this purpose.

A particularly desirable product illustrated by FIGS. 1 and 2 comprises a siding board of the usual tapered cross-section, wherein the irregular outer edge 79 is formed in the thicker of the two outer edges 78, the board being laid up in the usual overlapping wall structure with the thicker edge downwards. A siding board of this kind presents a certain practical difficulty in forming into a wall, since the carpenter must accurately level each board by eye, or by levelling the top edge to ensure that the boards are truly horizontal. To avoid this difficulty the board is provided in one face that will constitute the board rear face with a straight longitudinal inner edge 81, disposed parallel to the straight outer edge 78, but placed more closely adjacent to the irregular outer edge 79. This straight inner edge is therefore available for abutment by the straight longitudinal outer edge of the immediately adjacent lower board, thereby ensuring proper location of successive boards. No difficulty is therefore experienced by even an inexperienced operator in laying up a siding wall, in that it involves merely ensuring that the lowermost board or boards are accurately aligned and thereafter abutting straight edges one with another.

As illustrated, the inner edge 81 can be pre-formed and the pre-formed boards fed to the apparatus of the invention. The edge can also be post-formed. The apparatus in which the pre-or-post-forming takes place can be placed in the flow path of the boards and respectively feed the boards to the apparatus or be fed from the apparatus, so as to minimize the manual handling required. It is also possible to provide an apparatus in accordance with the invention including a cutter shaped and positioned to produce the edge in the same operation as the formation of the irregular edge. Usually the spacing between the inner edge 81 and the adjacent straight edge 78 is sufficient that the irregular edge never coincides with the inner edge, so that the irregular edge always completely overlaps the abutting straight edge of the lower board.

It is a surprising aspect of this application that the cutter head 22 is rotated clockwise as seen in FIG. 1, in the direction of the arrow 80, which corresponds to the direction of movement of the boards through the apparatus. This is the reverse of the normal direction of rotation in the usual board edging machine and is found to avoid tearing of the board ends as they leave the cutter.

It will be seen that a corresponding affect could be obtained by varying the speed of travel of the boards through the machine, by suitable control of the drive unit 18. Such units generally are not suitable for operating at varying speeds in this manner, since they must then continuously accelerate and de-accelerate the boards, which are of considerable weight and have appreciable frictional contact with the bed 16, so that relatively high inertias are involved.

In the embodiment of FIG. 3 the arms 50 are directly rigidly connected to the shaft 30 instead of through the intermediary yoke 28, while the yoke is replaced by a plate, given the reference 28, carrying the motor 33 and the shaft 24 etc. The plate 28 is suspended by two spaced links 82 from a body 83 fast with the shaft 30, a projection of the pivot axis 84 of the links intersecting the axis 25 of the cutter head just beneath the head (see FIGS. 4 and 5). A connecting swing link 85 has one end pivotally connected at 86 to the plate 28, while the other end is pivotally connected at 87 to a bracket 88 mounted on the wall 12, the vertical position of the bracket being adjustable vertically by movement of fastening screws 89 in a vertical slot 90.

As the arms 50 move under the control of the cam follower 49 the shaft 30 is rotated, which rotates the body 83 to move the cutter head for corresponding to and fro movement in engagement with the edge of the board. Clockwise rotation of the shaft 30 (as seen in FIG. 3) to cause the cutters 23 to cut deeper into the edge of the board also causes tilting of the cutter head about the link axis 84, under the influence of the swing link 85, so that the bevel angle to the horizontal to which the edge is formed by the cutter head is decreased. This action as just described is illustrated by FIGS. 4 and 5. This change of the bevel angle gives an effect which more nearly simulates the edge shape that is found naturally in planks cut from a log with one edge constituted by the outer surface of the log. Equivalent mechanical linkages for producing simultaneous to and fro movement and tilting of the cutter head can instead be applied.

Although the apparatus embodying the invention that has been described is used for the production of a single irregular edge on a board, it is also applicable to the manufacture of a product in which both edges have been cut to an irregular shape. Such a product is particularly suitable, for example, as fencing boarding giving a desired random effect. Thus, a board can be formed in this manner by passing it twice through the apparatus. Alternatively, apparatus can be provided in which two edge cutters are arranged to cut the two respective edges of the board simultaneously or in succession to respective irregular shapes in a single pass of the board through the apparatus.

We claim:

1. Apparatus for cutting a longitudinal edge of a board to an irregular shape, comprising a body, a bed on the body and on which the board moves in passing through the apparatus in a corresponding longitudinal direction, an edge cutter mounted by the body for to and fro movement in a direction transverse to the said longitudinal direction to engage the cutter with an edge of a board on the bed and to shape the engaged edge thereof, and cutter moving means mounted by the body for moving the edge cutter in an irregular motion in the said transverse direction to cut the engaged edge to the required irregular shape, the cutter moving means comprising a motor, cam means constituted by a cam having an irregular profile and a cooperating cam follower connected between the motor and the edge cutter whereby the edge cutter is driven by the motor through the cam means for the required irregular movement, and a variable speed gear connected between the motor and the cam means for varying the speed at which the cam means is driven by the motor and thereby varying the effect of the irregular cam profile on the to and fro movement of the edge cutter.

2. Apparatus as claimed in claim 1, and including a motor connected to the variable speed gear and operative to cyclically vary the speed ratio thereof.

3. Apparatus as claimed in claim 1, wherein the variable speed gear comprises a pair of belt-connected pulleys at least one of which is a variable-diameter pulley, and there are provided means for moving a shaft on which one of said pulleys of the variable speed gear is mounted to change the speed ratio of the gear.

4. Apparatus as claimed in claim 1, wherein the variable speed gear comprises two pairs of belt-connected pulleys, at least one pulley of each pair being of variable diameter, and one pulley from each pair being mounted on a common shaft, means mounting the common shaft to move the two pulleys thereon relative to the other pulleys and thereby vary the speed ratio of the gear, and motor means for moving the said shaft.

5. Apparatus as claimed in claim 4, wherein the said motor means comprises a motor driven cam.

6. Apparatus as claimed in claim 1 wherein the said cam means comprise a rotatable cam which is rotated by the motor and the cam follower is operatively connected to the edge cutter.

7. Apparatus as claimed in claim 1, comprising mounting means carrying the edge cutter, means mounting the mounting means on the body for to and fro movement about a vertical axis to provide the said to and fro movement to the cutter, a cutter driving motor mounted on the mounting means and means connecting the cutter driving motor and the edge cutter for the former to drive the latter, wherein the said cam is a rotatable cam, and the said cam follower operatively connects the mounting means and the cam to move the former for said to and fro movement upon rotation of the latter.

8. Apparatus as claimed in claim 1, wherein the direction of rotation of the edge cutter at its point of engagement with the board edge is the same as the direction of movement of the board through the apparatus.

9. Apparatus as claimed in claim 1, wherein the edge cutter is mounted on a rotatable shaft for rotation about a respective axis and there are provided means mounting the shaft to the body for the said to and fro movement of the edge cutter and for tilting about another axis transverse to the first mentioned axis, and there is provided a link connection between the body and the rotatable shaft whereby the said to and fro movement of the edge cutter is accompanied by simultaneous tilting of the shaft and the edge cutter thereon to change the bevel angle of the cut irregular edge as the depth of cut into the board is changed.

* * * * *